United States Patent

[11] 3,539,060

| [72] | Inventor | Dominic Rastelli |
| | | 417 SW 124th St., Seattle, Washington 98146 |
| [21] | Appl. No | 743,369 |
| [22] | Filed | July 9, 1968 |
| [45] | Patented | Nov. 10, 1970 |

[54] ELEVATOR-EQUIPPED TRANSPORT VEHICLE
3 Claims, 5 Drawing Figs.

[52] U.S. Cl. .................................................. 214/75, 214/16.4
[51] Int. Cl. .................................................. B60p 1/44
[50] Field of Search .................................... 214/75, 75(T)

[56] References Cited
FOREIGN PATENTS

| 842,132 | 2/1939 | France | 214/75(T)UX |
| 515,680 | 2/1955 | Italy | 214/75(T)UX |
| 520,885 | 3/1955 | Italy | 214/75(T)UX |
| 364,222 | 10/1962 | Switzerland | 214/75(T)UX |

*Primary Examiner*—Gerald M. Forlenza
*Assistant Examiner*—Raymond B. Johnson
*Attorney*—Ford E. Smith ABSTRACT: A transport vehicle is provided with suspended elevator means adapted to receive and vertically move, between the ground and multiple levels on or above the vehicle bed wheeled racks containing cargo units.

Patented Nov. 10, 1970
3,539,060
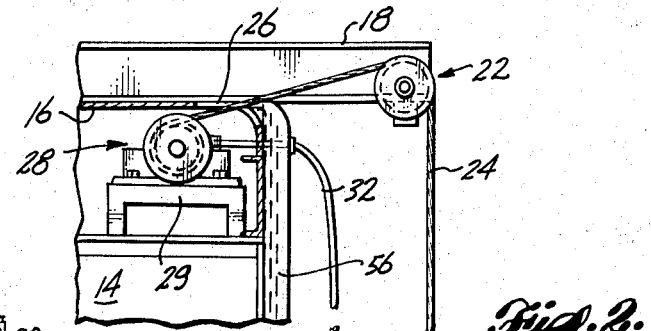
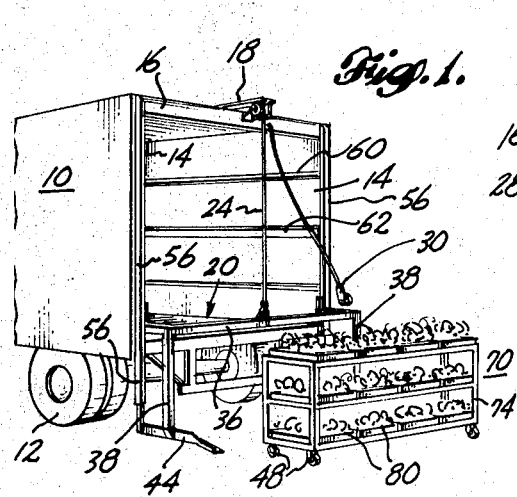
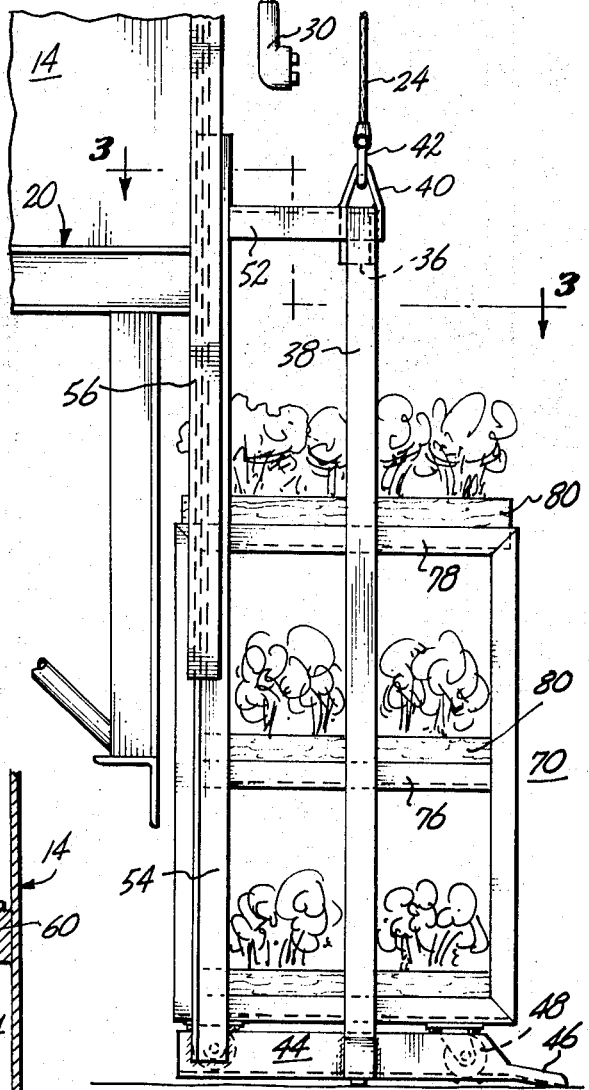
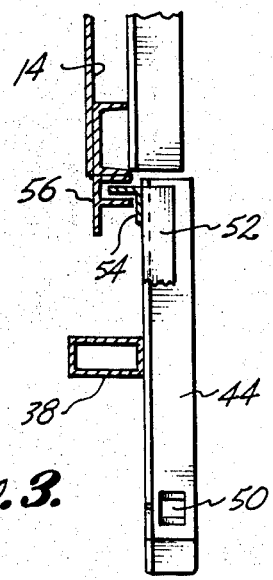
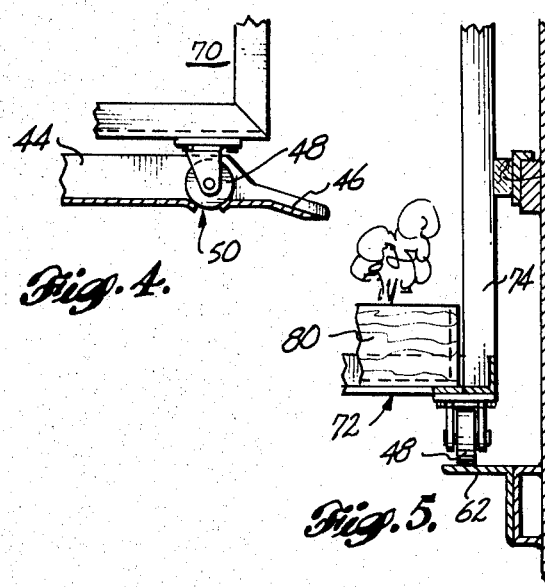
INVENTOR
DOMINIC RASTELLI
BY
Ford E. Smith
ATTORNEY

ELEVATOR-EQUIPPED TRANSPORT VEHICLE

SUMMARY

A vehicle having a load-carrying bed is provided with overhead structure including a beam protruding beyond an edge of the bed. An inverted yoke is raised and lowered relative the vehicle bed beneath the beam by means of a cable which passes over a guide on the beam to reversible power operated winch means. Guide means between the yoke and the vehicle bed insure vertical, nonswaying movement. The yoke is adapted at its depending ends to receive and support a wheeled rack containing cargo units. The vehicle overhead structure, in those cases where the wheeled racks are the size to be tiered, is provided with spaced-apart ways to receive and support the racks. This invention is here disclosed with specific application to transport vehicles as used by nurserymen and as to its utility in the transport of nurserymen's flats. It is contemplated that other specific uses will be apparent.

DRAWINGS

FIG. 1 is a perspective view of the rear portion of a transport vehicle having the invention incorporated;

FIG. 2 is an enlarged side view of the essential elements of the elevator means in association with the rear of a transport vehicle;

FIG. 3 is a section taken in line 3–3 of FIG. 2;

FIG. 4 is a detailed sectional view; and

FIG. 5 is a fragmentary detailed view showing a portion of a wheeled rack in supported position relative the sidewall of the vehicle.

DESCRIPTION

Transport vehicle body 10, supported on wheels 12, has sidewalls 14, 14 and overhead structure 16 which includes a beam 18 overhanging the edge of truck bed 20. Beam 18 supports a guide sheave 22 over which passes hoisting line 24 that enters body 10 through opening 26 and passes to winch 28, preferably supported by structure 29 under the roof of truck body 10 near its rear. Desirably, winch 28 is operated by an electric motor which may be remotely controlled by an operator manipulating switch in controller 30 on cable 32.

A yoke comprising crossmember 36 having legs 38 depending therefrom is intermediate its ends connected by a loop 40, clevis 42, to cable 24. At the lower end of each leg 38 is an angle iron foot member 44 which receives and, during vertical movement, supports a wheeled cart 70. Load-carrying member 44 has a downturned lip 46 forming a ramp useful when a cart is rolled into place on an opposed pair of foot members 44. The casters 48 on the cart 70 are smoothly guided into position by side flanges on the foot members 44, each of which has a hole 50 into which a caster wheel may drop or be engaged to prevent unintentional dislodgement of the cart. The foot members 44 are attached to legs 38 in such manner that the yoke is balanced.

At or near the upper end of each leg 38 of the yoke is a cross member 52 that extends rearward and joins with an upright rail 54 in the manner best shown in FIGS. 2 and 3. Attached to the rear of each of the sidewalls 14 of the vehicle body 10 is a guideway comprising a pair of spaced-apart members forming a channel 56 to receive an outstanding flange or rail member 54. Each guideway 56 extends upward from a point below the deck 20, a sufficient distance thereabove to adequately guide vertical travel of the elevator yoke. This structure constitutes interfitting upright tongue-and-groove means that guide vertical movement of the yoke.

Within the vehicle body 10 are rub rails 60 and a load-supporting way or ledge rail 62. A cart 70 is generally right rectangular and has a base 72 on the underside corners of which are casters or wheels 48. Base 72 has uprights 74 at the corners supporting intermediate shelfs 76 and the top shelf 78 which receive cargo containers, in this instance contemplated as nurserymen's flats 80 for illustrative purposes. Such flats are usually filled with earth and plants or flowers.

The size of the load-carrying carts or racks is such that in a preferred application of the invention, the height of the cart from its casters 48 is less than the distance from the bed of the vehicle body 10 to the underside of way or rail 62. Likewise, the location of rail 62 is such that a second tier of loaded carts 70 may be placed thereon over the lower tier and under the roof of the vehicle body. The length of the carts is substantially the maximum available space between the sidewalls 14, 14 of body 10 at least equal to the spacing of opposed rails 62. Their depth in this particular application is slightly more than that of the length of flats 80.

OPERATION

When it is desired to load a vehicle body 10, the inverted yoke 36 is lowered to the ground as shown in FIG. 1. A cart 70 is wheeled on to the foot members 44. Thereupon, the operator using the hand control piece 30 activates the motor of winch 28, imparting an upward draft on cable 24. This causes yoke 36 to rise vertically, such movement being in a guided manner by reason of coaction between the flanged rail members 54 and the vertical guideways 56 as best seen in FIG. 3. Hoisting is terminated when the yoke has been raised so that foot members 44 are aligned either with the bed 20 of body 10 or with ledge rails 62 on the body sidewalls. The operator may then roll the cart off the elevator mechanism and transfer it into the vehicle body 10. Chocks or wheel blocks (not shown) may be placed to secure the cart in the vehicle during transit. The unloading operation is substantially the reverse of the loading procedure described.

A trucker employing a vehicle body equipped as here disclosed will ordinarily travel with the elevator mechanism raised substantially to its upper limit in order that there will be no traffic interference by reason of the rearward protruding lifter or foot members 44.

The equipment and apparatus described herein may be subject to variations and modifications. In order that it be applied to other uses, all such changes and alterations as fairly fall within the scope of the subjoined claims are contemplated as part of this invention.

I claim:

1. In combination with a vehicle having a horizontal load-carrying bed surmounted by peripheral wall structure, the improvement, comprising:
   overhead frame structure supported above said bed by said peripheral structure and including a sheave disposed to overhang the rear edge of said bed;
   said peripheral wall structure beneath said overhanging sheave including a vertical pair of spaced-apart guide rails at the rear edge of said bed equally offset toward the sides with respect to said sheave;
   an inverted U-shaped yoke beneath said sheave spaced outward from the rear edge of said bed and comprising a crossmember having a leg depending at each end, said yoke including means adjacent said bed edge guidedly associating the yoke with said guide rails for vertical travel with respect thereto;
   said yoke having foot members providing an opposed pair of instanding load-carrying ledges each said ledge being located at the lower end of a yoke leg and disposed normal to said bed edge and projecting rearwardly with relation thereto;
   winch means on said vehicle including a hoisting line extending therefrom over said sheave and connected to the yoke providing means to move said yoke between a position where said ledges are at ground level to a position where said ledges align with said bed and vice versa; and
   a load-carrying rack to rest on and span between the instanding load-carrying ledges of said yoke.

2. The structure of claim 1 in which the rack is wheeled.

3. The combination of claim 2 in which said ledges are each provided with a depression into which a cart wheel is disposed during vertical travel of the yoke.